C. GILSON.
TURBINE BLADE HOLDING MEANS.
APPLICATION FILED MAY 7, 1908.
941,411.
Patented Nov. 30, 1909.
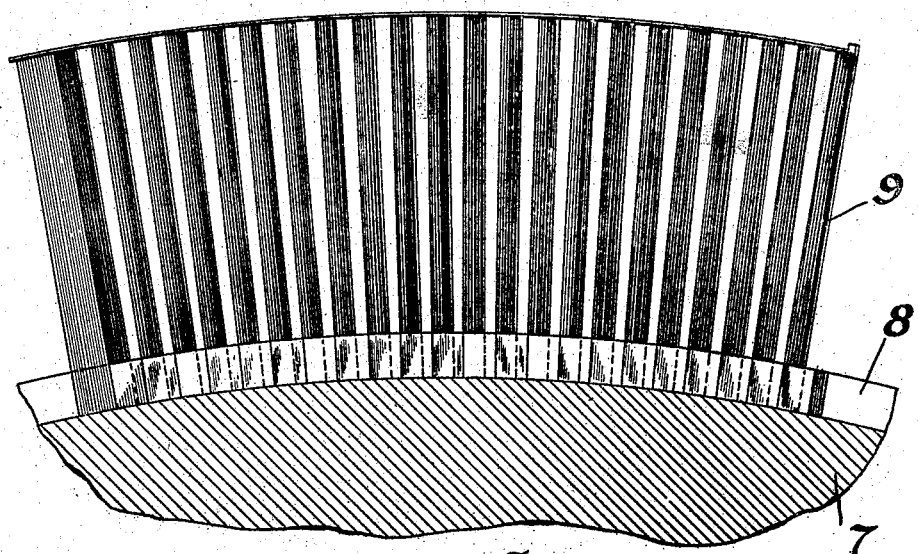
Fig. 1.
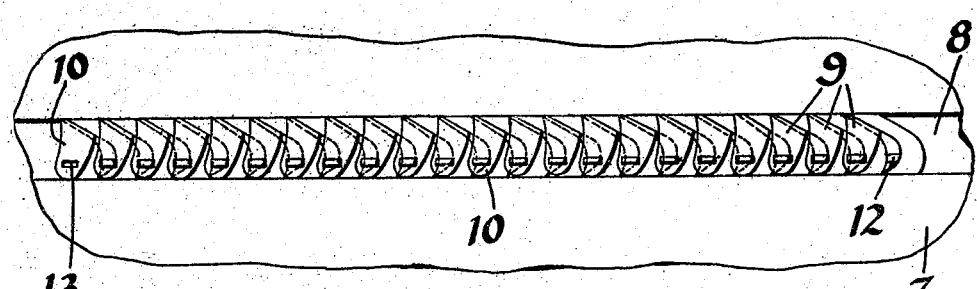
Fig. 2.
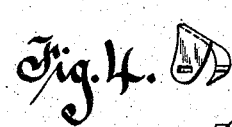
Fig. 4.
Fig. 3.   Fig. 5.
WITNESSES:
INVENTOR.
Christian Gilson
BY
ATTORNEY IN FACT.

UNITED STATES PATENT OFFICE.

CHRISTIAN GILSON, OF PITTSBURG, PENNSYLVANIA, ASSIGNOR TO THE WESTING-HOUSE MACHINE COMPANY, A CORPORATION OF PENNSYLVANIA.

TURBINE-BLADE-HOLDING MEANS.

941,411.

Specification of Letters Patent. Patented Nov. 30, 1909.

Application filed May 7, 1908. Serial No. 431,440.

*To all whom it may concern:*

Be it known that I, CHRISTIAN GILSON, a citizen of the United States, and a resident of Pittsburg, in the county of Allegheny and State of Pennsylvania, have made a new and useful Invention in Turbine-Blade-Holding Means, of which the following is a specification.

This invention relates to elastic fluid turbines and more particularly to turbine blades.

An object of this invention is the production of simple means for spacing and shrouding the outer or free ends of the blades. This and other objects I attain in a turbine embodying the features herein described and illustrated.

In the drawings accompanying this application and forming a part thereof: Figure 1 is a fragmental section of a rotor blade-carrying element of a turbine and illustrates an embodiment of my invention; Fig. 2 is a developed plan of Fig. 1; Figs. 3 and 4 are respectively side and end elevations of a blade embodying my invention; and Fig. 5 is a side elevation of a blade embodying my invention.

While I have illustrated my invention in connection with the rotating blade carrying element of a turbine, I wish it to be understood that I do not contemplate so limiting it. Throughout the specification and in the claims I will utilize the word "blade" in a broad sense; that is, to include both the rotating and the stationary blades of the turbine, and I wish it to be specifically understood that where the term "blade-carrying element" is employed it is also utilized in the broad sense and means either the rotating or stationary blade-carrying element of the turbine.

A blade carrying element 7 is provided with a blade mounting slot 8, in which a single row of blades 9 is mounted. The individual blades are secured to the blade-carrying element by means of separate calking pieces which are located between the adjacent blades of each row and which, by being transversely expanded, are caused to grip the walls of the blade-mounting slot and the exposed faces of the adjacent blades and to thereby secure the blades in place within the slot. The outer or free ends of the blades are secured together by means of projections 10, one of which is formed integrally with each blade and is bent over and secured to the next adjacent blade.

The blades 9 are drawn or otherwise formed in long sections of the proper contour, from which the blades of proper length are cut. Each blade is substantially crescent shaped in cross section, one horn of the crescent, which is ordinarily called the wing of the blade, is, however, longer than the other. In cutting the blade the longitudinally extending projection 10 is formed on the wing of each blade and is located at one end of the blade. In addition to this a short tip 12 is formed on the shorter horn of the blade at one end. A slot 13 is provided in the outer end of each tongue and is adapted, when the projection 10 is bent over at right angles to the blade, to receive the tip 12 formed on the next adjacent blade. The tip, after the projection 10 is in place, is riveted over to secure the projection in place and consequently to secure the outer or free ends of the two blades rigidly together. With this construction all the blades in one row are shrouded and are spaced. The blades 9 are first mounted in the blade mounting slots of the blade carrying element and are secured therein. The projections 10 of each blade are then bent over to receive the tip 12 of the next adjacent blade and the tip is riveted over. The blades, instead of being mounted in the slot by means of intermediate spacing pieces, may be secured to a blade mounting strip which is subsequently mounted in the blade mounting slot and secured in place.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In combination with the blade holding element of a turbine, a plurality of blades secured thereto and means, comprising a longitudinally extending projection and a tip formed integrally on each blade, for securing the outer or free ends of the blades together.

2. In combination with the blade holding element of a turbine, a plurality of blades secured thereto, a longitudinally extending projection and a tip formed on the outer end of each blade whereby the outer or free ends of the blades are secured together by securing the projection of one blade to the end of the next adjacent blade by riveting over said tip.

3. A turbine blade comprising a body portion having at one end a laterally projecting lip provided with a hole and a lug adjacent to said lip.

4. A turbine blade comprising a body portion provided with a flexible extension having a hole and means on the blade for engagement with a hole in the extension of an adjacent blade.

In testimony whereof, I have hereunto subscribed my name this 30th day of April, 1908.

CHRISTIAN GILSON.

Witnesses:
CHARLES W. McGHEE,
E. W. McCALLISTER.